(12) United States Patent
Hayashi et al.

(10) Patent No.: US 11,049,477 B2
(45) Date of Patent: Jun. 29, 2021

(54) CONFIGURATION DISPLAY APPARATUS, CONFIGURATION DISPLAY METHOD, AND RECORDING MEDIUM

(71) Applicant: Hitachi, Ltd., Tokyo (JP)

(72) Inventors: Shinichi Hayashi, Tokyo (JP); Katsunori Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/812,417

(22) Filed: Mar. 9, 2020

(65) Prior Publication Data

US 2021/0005164 A1  Jan. 7, 2021

(30) Foreign Application Priority Data

Jul. 3, 2019 (JP) .............................. JP2019-124277

(51) Int. Cl.
*G09G 5/38* (2006.01)
*G09G 5/373* (2006.01)

(52) U.S. Cl.
CPC .............. *G09G 5/38* (2013.01); *G09G 5/373* (2013.01); *G09G 2354/00* (2013.01)

(58) Field of Classification Search
CPC ...... G09G 5/38; G09G 5/373; G09G 2354/00; G06T 11/206; G06F 16/287; G06F 16/9577
See application file for complete search history.

(56) References Cited

U.S. PATENT DOCUMENTS

| | | | |
|---|---|---|---|
| 2004/0061701 A1* | 4/2004 | Arquie | H04L 43/0882 345/440 |
| 2005/0182764 A1* | 8/2005 | Evans | G06F 16/287 |
| 2015/0356763 A1* | 12/2015 | Fulks | G06T 11/00 345/629 |

FOREIGN PATENT DOCUMENTS

| | | |
|---|---|---|
| EP | 3240231 A1 | 11/2017 |
| WO | 2016/103421 A1 | 6/2016 |

* cited by examiner

*Primary Examiner* — Jeffery A Brier
(74) *Attorney, Agent, or Firm* — Mattingly & Malur, PC

(57) ABSTRACT

The Web client includes: a component group searching unit which searches for a component group including a plurality of components that are aggregable as a same group among the plurality of components to be a display target; a display information arranging unit which arranges a display area for display information with respect to the searched component group and pieces of display information with respect to components that do not belong to the component group on a prescribed screen such that the display area and the pieces of display information of the components that do not belong to the component group do not overlap with each other; an in-group arranging unit which arranges pieces of display information with respect to the plurality of components included in the component group so as not to overlap with each other in the display area for display information with respect to the component group.

11 Claims, 13 Drawing Sheets

FIG. 4

VM management functional unit 42

Server cluster configuration information 200

| Server cluster ID (201) | Fabric ID (202) |
|---|---|
| Server cluster 1 | Fabric 1 |
| Server cluster 1 | Fabric 2 |
| Server cluster 2 | Fabric 1 |
| : | : |

Server configuration information 210

| Server ID (211) | Server cluster ID (212) |
|---|---|
| Server 1 | Server cluster 1 |
| Server 2 | Server cluster 1 |
| Server 3 | Server cluster 2 |
| : | : |

VM configuration information 220

| VM ID (221) | Server ID (222) |
|---|---|
| VM 1 | Server 1 |
| VM 2 | Server 1 |
| VM 3 | Server 2 |
| : | : |

FIG. 7

Database 53

Node information 500

| Node ID /501 | Node type /502 | Original ID /503 | X coodinate /504 | Y coordinate /505 | Width /506 | Height /507 |
|---|---|---|---|---|---|---|
| 0 | Tier | Gold | 100 | 700 | 20 | 20 |
| 1 | Storage | Storage 1 | 200 | 600 | 20 | 20 |
| 2 | Fabric | Fabric 1 | 150 | 500 | 20 | 20 |
| 3 | Server cluster | Server cluster 1 | 200 | 400 | 400 | 350 |
| : | : | : | : | : | : | : |

Link information 510

| Coupling source node ID /511 | Coupling destination node ID /512 |
|---|---|
| 0 | 1 |
| 1 | 2 |
| 2 | 3 |
| : | : |

CONFIGURATION DISPLAY APPARATUS, CONFIGURATION DISPLAY METHOD, AND RECORDING MEDIUM

CROSS-REFERENCE TO PRIOR APPLICATION

This application relates to and claims the benefit of priority from Japanese Patent Application No. 2019-124277 filed on Jul. 3, 2019, the entire disclosure of which is incorporated herein by reference.

BACKGROUND

The present invention relates to a technique for displaying components and relations among components in an IT system.

In order to operate an IT system and find and improve problems, it is important that a configuration of the IT system, relations among components, and states of the components are displayed and that a manager of the IT system is able to comprehend the displayed information. By comprehending the state of a component, whether or not the component requires a countermeasure can be determined. By comprehending relations among components, an effect of a problematic component on components related thereto can be confirmed and whether or not the problem should be preferentially solved can be determined. By comprehending the configuration of the IT system, an impact of a problem on the entire IT system can be determined.

As an example of a technique for displaying a configuration of an entire IT system, a technique disclosed in WO 2016/103421 is known.

In addition, as a graph drawing algorithm for displaying components and relations thereof, a graph drawing algorithm (Force-directed Graph Drawing Algorithm) using a dynamic model is known. With a graph drawing algorithm using a dynamic model, by simulating an action of pieces of display information (for example, icons) indicating components (nodes) of repelling each other and an action of pieces of display information of linked nodes of attracting each other, coordinates on a screen of the pieces of display information of nodes can be calculated in such a manner that lengths of links are shortened, intersections of links are minimized, and an entire graph and relations among nodes are readily comprehended. Components of an IT system and relations thereof can be displayed using such a graph drawing algorithm.

SUMMARY

In order to display states of components in a wide range (for example, an entirety) of an IT system, icons (component icons) representing all of the components must be displayed on a screen, and coordinates of the component icons on the screen must be determined. Displaying relations among the components requires determining the coordinates of the component icons on the screen so that the relations can be readily comprehended. When the components of an IT system include tens of thousands of VMs (Virtual Machines: virtual computers), coordinates on a screen of tens of thousands of component icons must be determined.

Cases of displaying components of an IT system may include cases where components of entire IT systems around the world are display targets as well as case where a filtering function or the like is used to limit the display to components of IT systems in a specific region or a specific data center. Therefore, coordinates on a screen of component icons cannot be calculated in advance and must be calculated after, for example, an operation by a user.

When calculating coordinates of component icons with a graph drawing algorithm using a dynamic model, if there are tens of thousands of components, a process of calculating coordinates on the screen of the component icons cannot be completed in, for example, a few seconds and requires a relatively long period of time.

The present invention has been made in consideration of the circumstances described above, and an object thereof is to provide a technique that enables components of an IT system and relations among the components to be displayed in a speedy and suitable manner.

In order to achieve the object described above, a configuration display system according to an aspect is a configuration display system that displays a plurality of components to be a display target and relations of the components in an IT system, the configuration display system including: a component group searching unit which searches for a component group including a plurality of components that are aggregable as a same group among the plurality of components to be the display target; a display information arranging unit which arranges a display area for display information with respect to the searched component group and pieces of display information with respect to components that do not belong to the component group on a prescribed screen so that the display area and the pieces of display information of the components that do not belong to the component group do not overlap with each other; an in-group arranging unit which arranges pieces of display information with respect to the plurality of components included in the component group so as not to overlap with each other in the display area for display information with respect to the component group; and a display control unit which causes a display screen on the basis of a screen on which pieces of display information with respect to the plurality of components to be a display target are arranged to be displayed.

According to the present invention, components of an IT system and relations among the components can be displayed in a speedy and suitable manner.

BRIEF DESCRIPTION OF THE DRAWINGS

FIG. 4 is a configuration diagram of a VM management functional unit according to one embodiment;

FIG. 7 is a configuration diagram of a database according to one embodiment;

DETAILED DESCRIPTION OF THE EMBODIMENT

An embodiment will be described with reference to the drawings. It should be noted that the embodiment described below is not intended to limit the invention as set forth in the accompanying claims and that all of the elements described in the embodiment and combinations thereof are not necessarily essential to solutions proposed by the invention.

Figure 1:
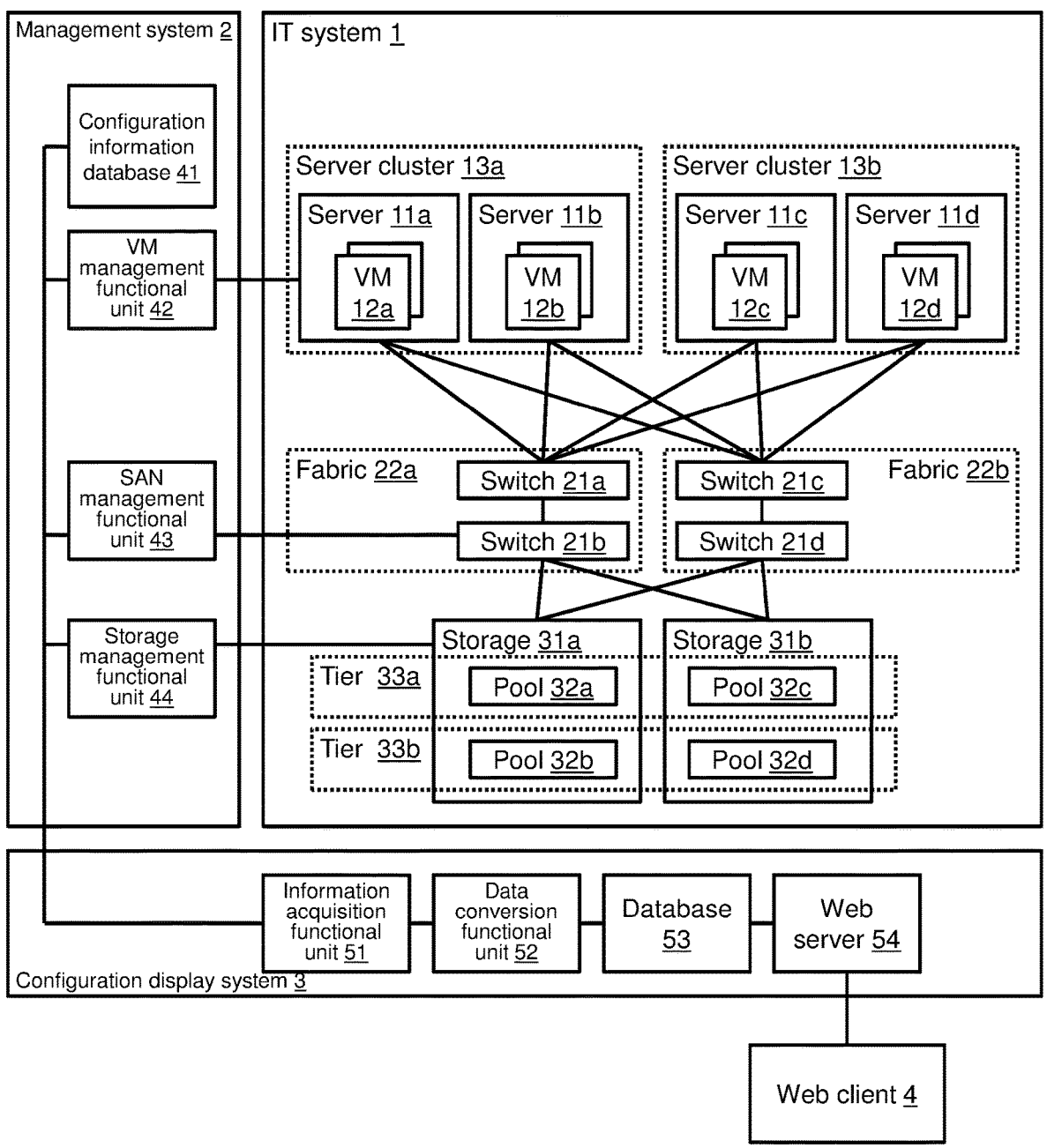
FIG. 1 is an overall configuration diagram of a computer system according to one embodiment.

FIG. 1 is an overall configuration diagram of a computer system according to one embodiment.

A computer system 1000 includes an IT system 1, a management system 2, a configuration display system 3, and a Web client 4 as an example of a configuration display apparatus.

The IT system 1 is a system which processes business information and which becomes a target of displaying components. As components (also referred to as nodes), the IT system 1 includes one or more servers 11 (11a, 11b, 11c, and 11d), one or more switches 21 (21a, 21b, 21c, and 21d), and one or more storages 31 (31a, 31b). It should be noted that, in reference symbols denoting components in the IT system in FIG. 1, a former-half numerical portion corresponds to a type of a component and a latter-half alphabetical character is for identifying an individual component among components of a same type.

The server 11 is an apparatus that executes a part of processing of business information. The server 11 is configured so that one or more VMs (virtual computers) 12 (12a and the like) run on the server 11. The VM 12 is also one of components of the IT system 1. In the present embodiment, server clusters 13 (13a and 13b) are constituted by a plurality of the servers 11. The server cluster 13 is also one of components of the IT system 1.

The switch 21 is an apparatus that couples the server 11 and the storage 31 to each other to transfer data. In the present embodiment, a fabric 22 is constituted by a plurality of the switches 21. The fabric 22 is also a component of the IT system 1.

The storage 31 is an apparatus that stores information for process by the server 11. In the storage 31, a pool 32 is configured as an area for storing data. In a plurality of the storages 31, the pool 32 is classified into Tiers 33 (33a and 33b) on the basis of access performance. In the IT system 1, a user can use a storage area of the storage 31 by designating a type of the Tier 33. Generally, a usage fee of a high-performance Tier 33 is large and a usage fee of a low-performance Tier 33 is small. The Tier 33 is also one of components of the IT system 1.

The management system 2 is a system that manages the IT system 1. The management system 2 has a configuration information database 41, a VM management functional unit 42, a SAN (Storage Area Network) management functional unit 43, and a storage management functional unit 44.

The configuration information database 41 is a database that stores configuration information in the IT system 1 which is not held by the VM management functional unit 42, the SAN management functional unit 43, and the storage management functional unit 44 such as an application that uses the VM 12, a business unit that owns the application, a data center, a region, or a country where the IT system 1 is installed, and configuration information of the Tier 33.

The VM management functional unit 42 acquires configuration information and performance information from the server cluster 13, the server 11, and the VM 12 in the IT system 1 and manages the information. The SAN management functional unit 43 acquires configuration information and performance information from the fabric 22 and the switch 21 and manages the information. The storage management functional unit 44 acquires configuration information and performance information from the storage 31 and the pool 32 and manages the information. The VM management functional unit 42, the SAN management functional unit 43, and the storage management functional unit 44 may be configured by having a processor (not shown) of the management system 2 execute a prescribed program.

The configuration display system 3 is constituted by, for example, a computer having a processor and a memory such as a PC (Personal Computer) and includes an information acquisition functional unit 51, a data conversion functional unit 52, a database 53, and a Web server 54. For example, the information acquisition functional unit 51, the data conversion functional unit 52, and the Web server 54 may be configured by having a processor execute a program stored in a memory.

The information acquisition functional unit 51 acquires configuration information of the respective components of the IT system 1 from the management system 2. Based on the configuration information acquired by the information acquisition functional unit 51, the data conversion functional unit 52 generates information necessary for displaying a screen (an IT system configuration screen: for example, refer to FIG. 14) showing components and relations among the components of the IT system 1, and stores the information in the database 53. The database 53 holds information necessary for displaying the IT system configuration screen. The Web server 54 transmits data stored in the database 53 to the Web client 4, and receives data from the Web client 4 and stores the received data in the database 53.

The Web client 4 executes, based on information received from the Web server 54, a process of displaying various screens (for example, the IT system configuration screen).

Next, a hardware configuration of the Web client 4 will be described.

Figure 2:
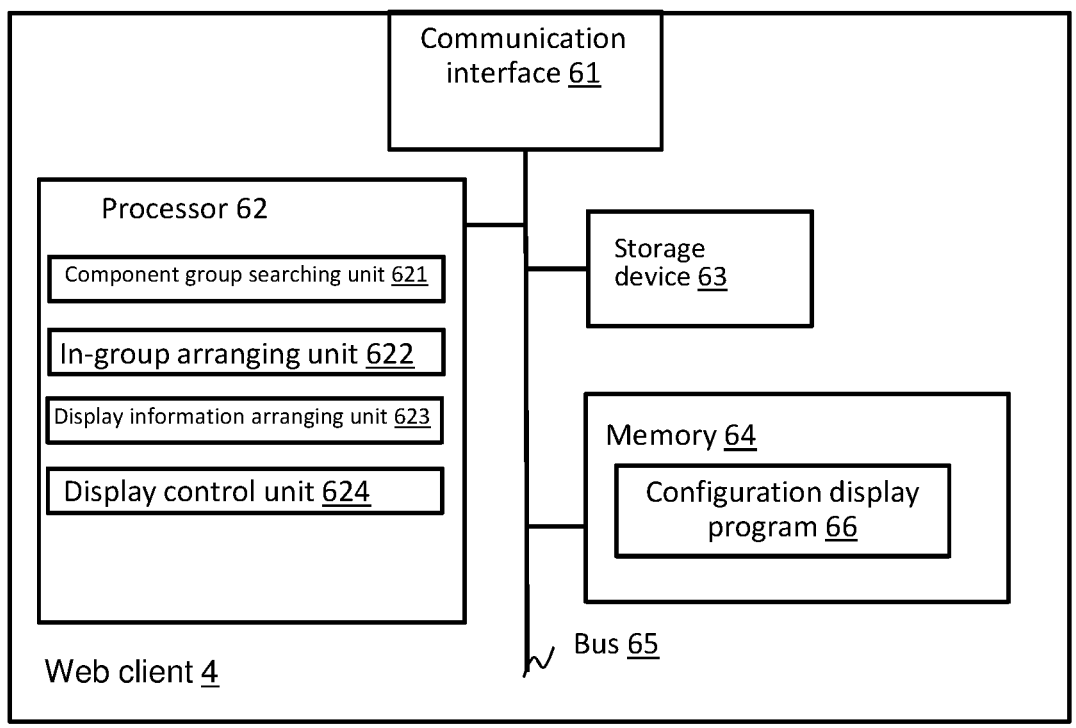
FIG. 2 is a configuration diagram of a Web client according to one embodiment.

FIG. 2 is a configuration diagram of a Web client according to one embodiment.

The Web client 4 is constituted by, for example, a computer such as a PC (Personal Computer) and has a communication interface 61, a processor 62, a storage device 63, and a memory 64. The communication interface 61, the processor 62, the storage device 63, and the memory 64 are coupled so as to be capable of communicating with each other via, for example, a bus 65.

The communication interface 61 is, for example, an interface such as a wired LAN card or a wireless LAN card and communicates with another apparatus (for example, the configuration display system 3) via a network.

The processor 62 executes various processes in accordance with programs stored in the memory 64 and/or the storage device 63. In the present embodiment, by having the processor 62 execute a configuration display program 66 to be described later, a component group searching unit 621, an in-group arranging unit 622, a display information arranging unit 623, and a display control unit 624 are configured.

The memory 64 is, for example, a RAM (RANDOM ACCESS MEMORY) and stores a program to be executed by the processor 62 as well as necessary information. In the present embodiment, the memory 64 stores the configuration display program 66 which executes a process of displaying the IT system configuration screen.

The storage device 63 is, for example, HDD (Hard Disk Drive), an SSD (Solid State Drive), or the like and stores a program to be executed by the processor 62 as well as data to be used by the processor 62.

Next, a configuration of the management system 2 will be described in detail with a particular focus on information managed by the management system 2.

Figure 3:
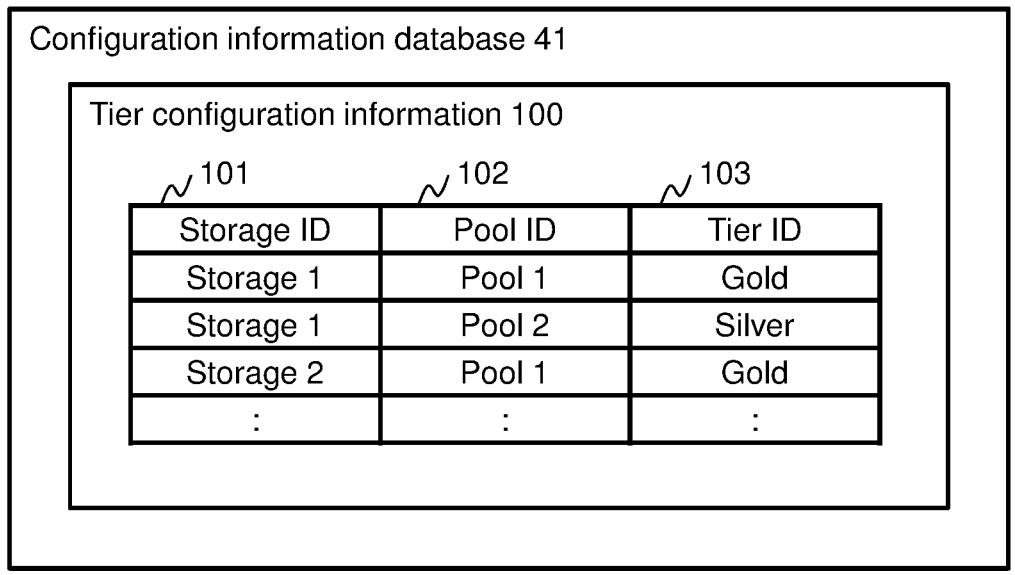
FIG. 3 is a configuration diagram of a configuration information database according to one embodiment.

FIG. 3 is a configuration diagram of a configuration information database according to one embodiment.

The configuration information database 41 holds Tier configuration information 100. The Tier configuration information 100 is information for managing the Tier 33 of the IT system 1 and stores an entry (a row) for each pool 32. An entry of the Tier configuration information 100 includes fields of a storage ID 101, a pool ID 102, and a Tier ID 103. The storage ID 101 stores an ID (a storage ID) of the storage 31 in which the pool 32 corresponding to the entry is configured. The pool ID 102 stores an ID (a pool ID) of the pool 32 corresponding to the entry in the storage 31. The Tier ID 103 stores an ID (a Tier ID) of the Tier 33 to which the pool 32 corresponding to the entry belongs.

FIG. 4 is a configuration diagram of a VM management functional unit according to one embodiment.

The VM management functional unit 42 holds server cluster configuration information 200, server configuration information 210, and VM configuration information 220.

The server cluster configuration information 200 is information for managing a coupling relation between the server cluster 13 and the fabric 22 and stores an entry which corresponds to the server cluster 13. An entry of the server cluster configuration information 200 includes fields of a server cluster ID 201 and a fabric ID 202. The server cluster ID 201 stores an ID (a server cluster ID) of the server cluster 13 which corresponds to the entry. The fabric ID 202 stores an ID (a fabric ID) of the fabric 22 coupled to the server cluster 13 which corresponds to the entry. In the present embodiment, when a plurality of fabrics 22 are coupled to a same server cluster 13, entries corresponding to the number of fabrics 22 coupled to the server cluster 13 exist in the server cluster configuration information 200 as entries corresponding to the same server cluster 13.

The server configuration information 210 is information for managing a relation between the server 11 and the server cluster 13 which the server 11 belongs to and stores an entry which corresponds to each server 11. An entry of the server configuration information 210 includes fields of a server ID 211 and a server cluster ID 212. The server ID 211 stores an ID (a server ID) of the server 11 which corresponds to the entry. The server cluster ID 212 stores an ID (a server cluster ID) of the server cluster 13 which the server 11 corresponding to the entry belongs to.

The VM configuration information 220 is information for managing a relation between the VM 12 and the server 11 which runs the VM 12 and stores an entry which corresponds to each VM 12. An entry of the VM configuration information 220 includes entries of a VM ID 221 and a server ID 222. The VM ID 221 stores an ID of the VM which corresponds to the entry. The server ID 222 stores an ID (a server ID) of the server 11 which runs the VM 12 corresponding to the entry.

Figure 5:
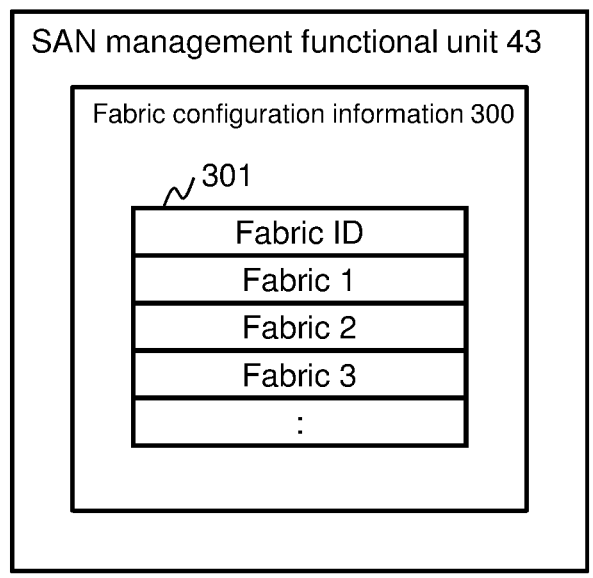
FIG. 5 is a configuration diagram of a SAN management functional unit according to one embodiment.

FIG. 5 is a configuration diagram of a SAN management functional unit according to one embodiment.

The SAN management functional unit 43 holds fabric configuration information 300. The fabric configuration information 300 is information for managing the fabric 22 which exists in the IT system 1 and stores an entry including a field of a fabric ID 301. The fabric ID 301 stores an ID (a fabric ID) of the fabric 22.

Figure 6:
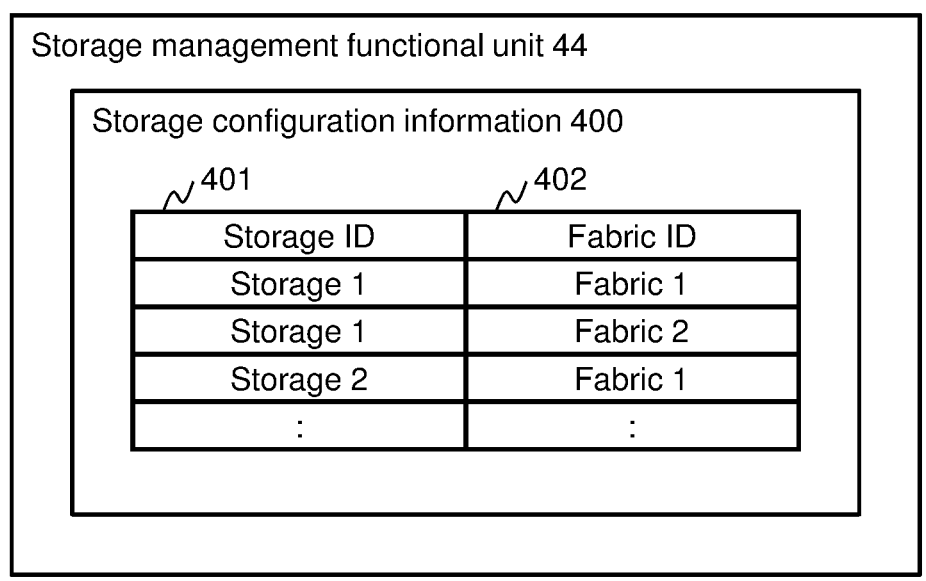
FIG. 6 is a configuration diagram of a storage management functional unit according to one embodiment.

FIG. 6 is a configuration diagram of a storage management functional unit according to one embodiment.

The storage management functional unit 44 holds storage configuration information 400. The storage configuration information 400 is information for managing a coupling relation between the storage 31 and the fabric 22 and stores an entry which corresponds to the storage 31. An entry of the storage configuration information 400 includes fields of a storage ID 401 and a fabric ID 402. The storage ID 401 stores an ID (a storage ID) of the storage 31 which corresponds to the entry. The fabric ID 402 stores an ID (a fabric ID) of the fabric 22 coupled to the storage 31 which corresponds to the entry.

Next, the database 53 of the configuration display system 3 will be described in detail.

FIG. 7 is a configuration diagram of a database according to one embodiment.

The database 53 holds node information 500 and link information 510.

The node information 500 is information for managing components (nodes) of the IT system 1 and stores an entry for each node. An entry of the node information 500 includes fields of a node ID 501, a node type 502, an original ID 503, an X coordinate 504, a Y coordinate 505, a width 506, and a height 507.

The node ID 501 stores an ID (a node ID) of the node which corresponds to the entry. The node type 502 stores a type of the node which corresponds to the entry. In the present embodiment, node types include a Tier, a storage, a fabric, a server cluster, a server, and a VM. The original ID 503 stores an ID of the node which corresponds to the entry. The X coordinate 504 stores an X coordinate to be a reference on a prescribed screen to display display information (for example, an icon) of the node which corresponds to the entry. The Y coordinate 505 stores a Y coordinate to be a reference on the prescribed screen to display the display information of the node which corresponds to the entry. The width 506 stores a width on the prescribed screen of the display information of the node which corresponds to the entry. The height 507 stores a height on the prescribed screen of the display information of the node which corresponds to the entry. In this case, the prescribed screen may be a virtual screen or a screen on which display information is to be actually displayed.

The link information 510 is information for managing coupling relations among nodes and stores an entry which corresponds to a pair of nodes that are coupled to each other. An entry of the link information 510 includes fields of a coupling source node ID 511 and a coupling destination node ID 512. The coupling source node ID 511 stores an ID of a lower node of a prescribed tier in the IT system 1 among coupled nodes. The coupling destination node ID 512 stores an ID of a higher node among the coupled nodes. In this case, as the prescribed tier in the IT system 1, for example, an order of VM, server (SV), server cluster (SC), fabric (FA), storage (ST), and Tier (TI) from a higher side may be adopted.

Next, processing operations of the computer system 1000 will be described.

First, a data preparation process will be described.

Figure 8:
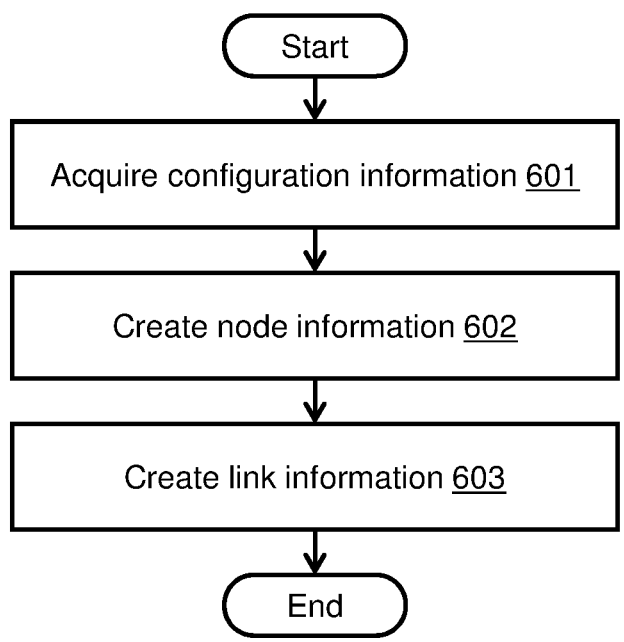
FIG. 8 is a flow chart of a data preparation process according to one embodiment.

FIG. 8 is a flow chart of a data preparation process according to one embodiment.

For example, the data preparation process is periodically executed. For example, the data preparation process may be executed once a day, and when the configuration of the IT system 1 is frequently changed, the data preparation process may be executed at shorter time intervals (for example, once an hour).

In the data preparation process, the management system 2 and the configuration display system 3 acquire configuration information and performance information from the IT system 1 (step 601). Specifically, the VM management functional unit 42 of the management system 2 acquires configuration information and performance information from each server 11 of the IT system 1. In addition, the SAN management functional unit 43 acquires configuration information and performance information from each switch 21. Furthermore, the storage management functional unit 44 acquires configuration information and performance information from each storage 31. Subsequently, the information acquisition functional unit 51 of the configuration display system 3 acquires the Tier configuration information 100 and the like from the configuration information database 41, the server cluster configuration information 200, the server configuration information 210, and the VM configuration information 220 from the VM management functional unit 42, the fabric configuration information 300 from the SAN management functional unit 43, and the storage configuration information 400 from the storage management functional unit 44.

Next, the data conversion functional unit 52 of the configuration display system 3 creates node information with respect to each node of the IT system 1 on the basis of the various types of information acquired by the information acquisition functional unit 51 in step 601 (step 602).

Specifically, the data conversion functional unit 52 creates an entry with respect to the Tier 33 among the nodes in the node information 500 on the basis of the Tier configuration information 100. In the entry, a unique node ID is stored in the node ID 501, the node type 502 is set as Tier, the original ID 503 is set as the Tier ID of the Tier ID 103, and the width 506 and the height 507 are set to values determined in advance. In addition, the data conversion functional unit 52 creates an entry with respect to the server cluster 13 among the nodes in the node information 500 on the basis of the server cluster configuration information 200. In the entry, a unique node ID is stored in the node ID 501, server cluster is set in the node type 502, the server cluster ID of the server cluster ID 201 is set in the original ID 503, and the width 506 and the height 507 are set to values determined in advance. Furthermore, the data conversion functional unit 52 creates an entry with respect to the server 11 among the nodes in the node information 500 on the basis of the server configuration information 210. In the entry, a unique node ID is stored in the node ID 501, server is set in the node type 502, the server ID of the server ID 211 is set in the original ID 503, and the width 506 and the height 507 are set to values determined in advance.

In addition, the data conversion functional unit 52 creates an entry with respect to a VM among the nodes in the node information 500 on the basis of the VM configuration information 220. In the entry, a unique node ID is stored in the node ID 501, VM is set in the node type 502, the VM ID of the VM ID 221 is set in the original ID 503, and the width 506 and the height 507 are set to values determined in advance. Furthermore, the data conversion functional unit 52 creates an entry with respect to a fabric among the nodes in the node information 500 on the basis of the fabric configuration information 300. In the entry, a unique node ID is stored in the node ID 501, fabric is set in the node type 502, the fabric ID of the fabric ID 301 is set in the original ID 503, and the width 506 and the height 507 are set to values determined in advance. In addition, the data conversion functional unit 52 creates an entry with respect to a storage among the nodes in the node information 500 on the basis of the storage configuration information 400. In the entry, a unique node ID is stored in the node ID 501, storage is set in the node type 502, the storage ID of the storage ID 401 is set in the original ID 503, and the width 506 and the height 507 are set to values determined in advance.

Next, the data conversion functional unit 52 creates the link information 510 on the basis of the Tier configuration information 100, the server cluster configuration information 200, the server configuration information 210, the VM configuration information 220, and the storage configuration information 400 (step 603).

Specifically, the data conversion functional unit 52 identifies a node ID respectively corresponding to the Tier ID of the Tier ID 103 and the storage ID of the storage ID 101 in the Tier configuration information 100 by referring to the node information 500, and stores, in the link information 510, an entry which stores a node ID corresponding to the Tier ID in the coupling source node ID 511 and which stores a node ID corresponding to the storage ID in the coupling destination node ID 512.

In a similar manner, the data conversion functional unit 52 identifies a node ID corresponding to the server cluster 13 and the fabric 22 having a coupling relation on the basis of the server cluster configuration information 200 and the node information 500, and stores an entry showing a coupling relation of the nodes in the link information 510. In addition, the data conversion functional unit 52 identifies a node ID corresponding to the server 11 and the server cluster 13 having a coupling relation on the basis of the server configuration information 210 and the node information 500, and stores an entry showing a coupling relation of the nodes in the link information 510. Furthermore, the data conversion functional unit 52 identifies a node ID corresponding to the VM 12 and the server 11 having a coupling relation on the basis of the VM configuration information 220 and the node information 500, and stores an entry showing a coupling relation of the nodes in the link information 510. In addition, the data conversion functional unit 52 identifies a node ID corresponding to the storage 31 and the fabric 22 having a coupling relation on the basis of the storage configuration information 400 and the node information 500, and stores an entry showing a coupling relation of the nodes in the link information 510.

According to the data preparation process described above, pieces of information of nodes in the IT system 1 are stored in the node information 500 and a coupling relation among respective nodes is stored in the link information 510.

Next, a configuration display process by the Web client 4 will be described.

Figure 9:
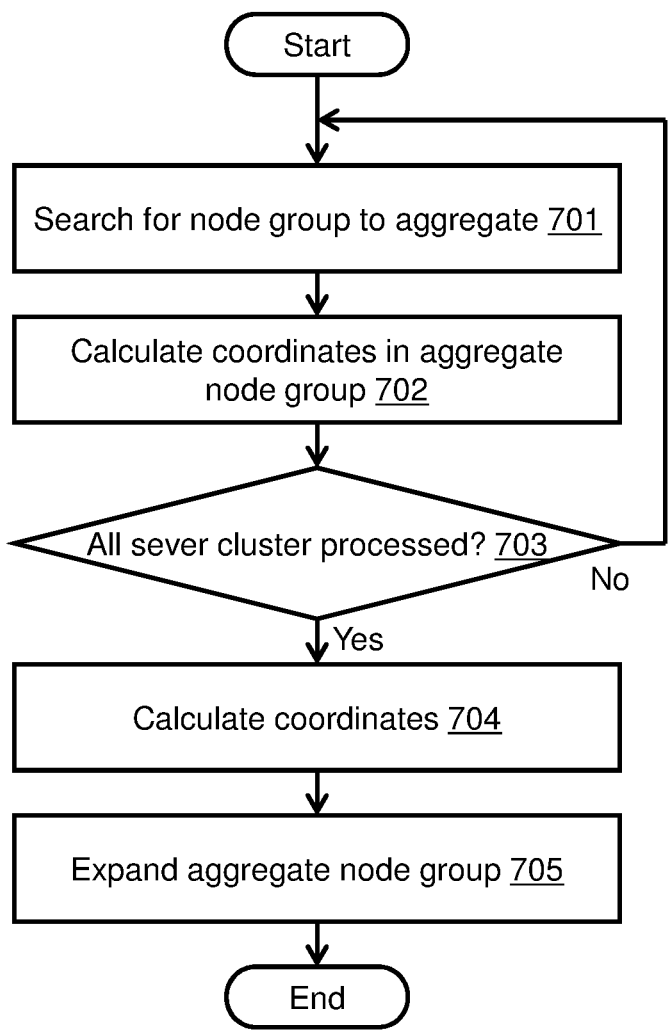
FIG. 9 is a flow chart of a configuration display process according to one embodiment.

FIG. 9 is a flow chart of a configuration display process according to one embodiment.

The component group searching unit 621 of the Web client 4 searches for an aggregate node group (a component group) which is constituted by a plurality of organizable (aggregable) nodes (step 701). In the present embodiment, the component group searching unit 621 searches for a single server cluster, a server that belongs to the server cluster, and a VM that runs on the server as an aggregate node group that is aggregable. Specifically, the component group searching unit 621 searches for a node of which the node type 502 is a server cluster from the node information 500, searches for a node that is a server related to the node that is a server cluster and a node that is a VM related to the server on the basis of the node information 500 and the link information 510, and organizes the searched nodes as an aggregate node group. The node information 500 and the link information 510 may be acquired in advance in their entirety from the Web server 54 or may be accessed via the Web server 54 as necessary.

Next, the in-group arranging unit 622 calculates a position (an X coordinate and a Y coordinate) with a prescribed origin as a reference of display information of each node for performing tiered display of pieces of display information of the respective nodes of the aggregate node group searched in step 701 so that the pieces of display information do not overlap with each other, calculates a width and a height that are necessary for displaying the pieces of display information of all nodes of the aggregate node group, and stores a result of the calculation in the width 506 and the height 507 of an entry of the node information 500 indicating a node (in this example, a server cluster) to be a reference of the aggregate node group (step 702). It should be noted that the position of the display information of each node for performing tiered display of pieces of display information of a plurality of nodes so that the pieces of display information do not overlap with each other can be calculated using, for example, a graph drawing algorithm using a dynamic model.

Next, the component group searching unit 621 checks whether or not processing has been performed with respect to all aggregate node groups that are constituted by a plurality of organizable nodes (step 703). At this point, in the present embodiment, the component group searching unit 621 checks whether or not a process of organizing nodes into aggregate node groups has been performed with respect to all server clusters. As a result, when the process has not been performed with respect to all server clusters (step 703: No), the component group searching unit 621 advances the process to step 701 and executes the process with unprocessed server clusters as targets.

On the other hand, when the process has been performed with respect to all server clusters (step 703: Yes), the display information arranging unit 623 calculates coordinates (an X coordinate and a Y coordinate) of a display position on a prescribed screen (for example, a virtual screen) with respect to pieces of display information of the aggregate node groups and nodes not included in the aggregate node groups (step 704).

Specifically, the display information arranging unit 623 calculates the coordinates with the exception of entries of which the node type 502 is the VM and the server included in the aggregate node groups among the node information 500 received from the configuration display system 3 or, in other words, using entries of nodes corresponding to server clusters that are representative of the aggregate node groups and the respective nodes that are not included in the aggregate node groups. When calculating coordinates of the display information of each node, a graph drawing algorithm using a dynamic model may be used. In the graph drawing algorithm using a dynamic model, for example, an adjustment amount of the position of the display information of each node in one position calculation process of the display information of each node is small, and by repetitively performing the position calculation process a plurality of times (for example, 100 times), the display information of each node moves to a more suitable position. When repetitively performing the calculation process of the position of the display information of each node in the graph drawing algorithm, Y coordinates may be adjusted to cause the position of the display information of each node to approach a tiered display between the respective nodes so that, for example, server cluster, fabric, storage, and Tier are aligned in this order from the top of the screen. In addition, when the pieces of display information of nodes overlap with each other, the X coordinates of the pieces of display information of the nodes may be adjusted so that the pieces of display information of the nodes do not overlap with each other.

In this case, the process of calculating coordinates of the display information of each node in step 704 occurs a processing load in accordance with, for example, an order of the square of the number of target nodes. In the present embodiment, in step 704, since an aggregate node group is treated as a single node, the number of target nodes can be reduced and the processing load can be suppressed. Therefore, processing time can be shortened. Although a coordinate calculation of the display information of each node in each aggregate node group must be performed when treating aggregate node groups as single nodes, since a processing load in this case is significantly smaller than the processing load that can be suppressed in step 704 by treating aggregate node groups as single nodes, the fact remains that the processing load can be suppressed.

Next, the display control unit 624 arranges the pieces of display information of nodes other than the aggregate node groups and, at the same time, expands and arranges the display information of each node in the aggregate node group using the position of the display information of the representative node (the node of a server cluster) as a reference, and causes a display unit (not shown) of the Web client 4 to display a screen on the basis of a virtual screen obtained as a result of arranging the pieces of display information (step 705).

Specifically, with respect to the pieces of display information of nodes other than the aggregate node groups, the display control unit 624 arranges the pieces of display information at the positions on the screen calculated in step 704. On the other hand, with respect to each aggregate node group, the display control unit 624 arranges display information of a server cluster in a prescribed size (for example, a same size as the pieces of display information of other nodes) at the position calculated in step 704 and arranges display information of a node other than a server cluster at a position obtained by adding coordinates of pieces of display information of the respective nodes (in the present embodiment, nodes corresponding to VMs and servers) calculated in step 702 to the position of the pieces of display information of the server clusters calculated in step 704. Subsequently, the display control unit 624 causes the display unit (not shown) of the Web client 4 to display a screen on the basis of a virtual screen on which the pieces of display information of the respective nodes are arranged. It should be noted that the display unit may be caused to display a part of the virtual screen while retaining the size of the display information of each node on the virtual screen or may be caused to display a reduced virtual screen or a reduced part of the virtual screen. It should also be noted that a reduction or an enlargement of the virtual screen or a part thereof to be displayed on the display unit, a range of the virtual screen to be displayed on the display unit, and the like may be changed in accordance with an instruction by a user of the Web client 4.

A configuration display process will now be described in detail with reference to FIG. 10 to FIG. 14.

Figure 10:
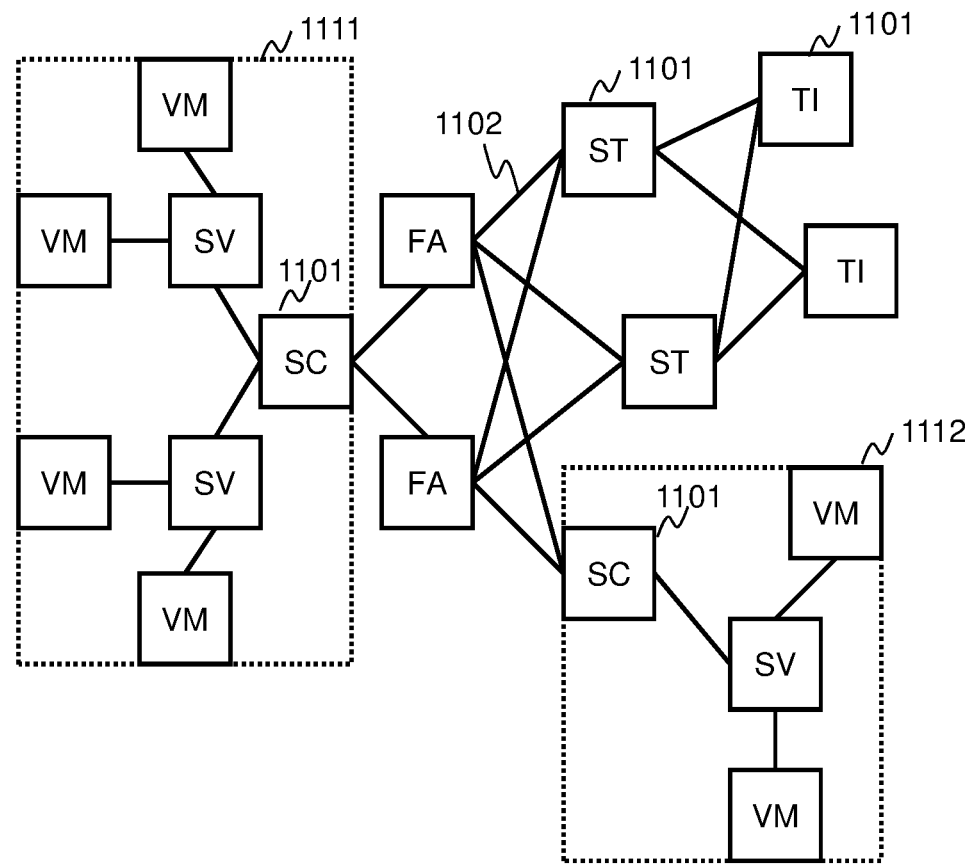
FIG. 10 is a diagram for illustrating nodes and node groups of an IT system according to one embodiment.
Figure 11:
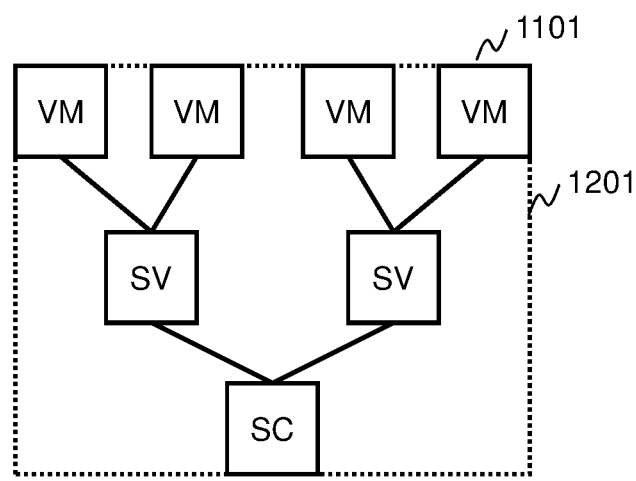
FIG. 11 is a diagram for illustrating an arrangement of pieces of display information of nodes in a node group according to one embodiment.
Figure 12:
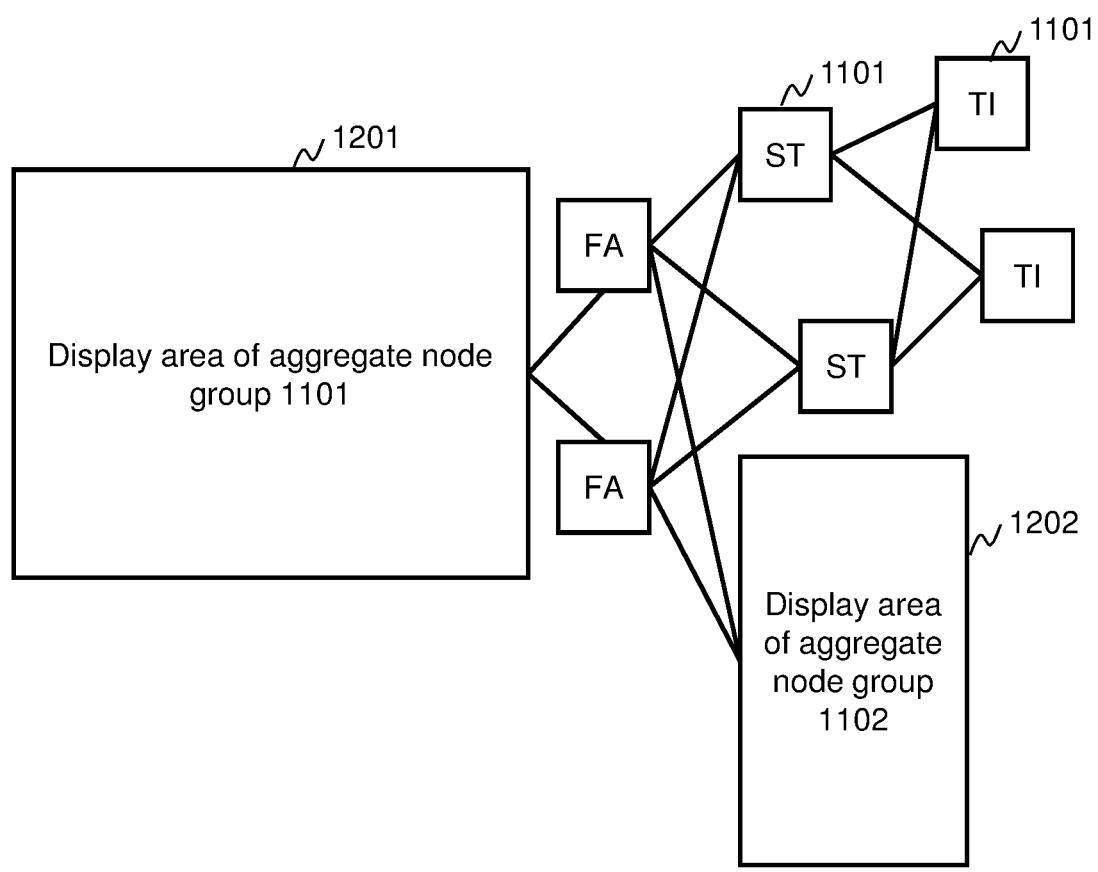
FIG. 12 is a diagram for illustrating node groups and other nodes according to one embodiment.
Figure 13:
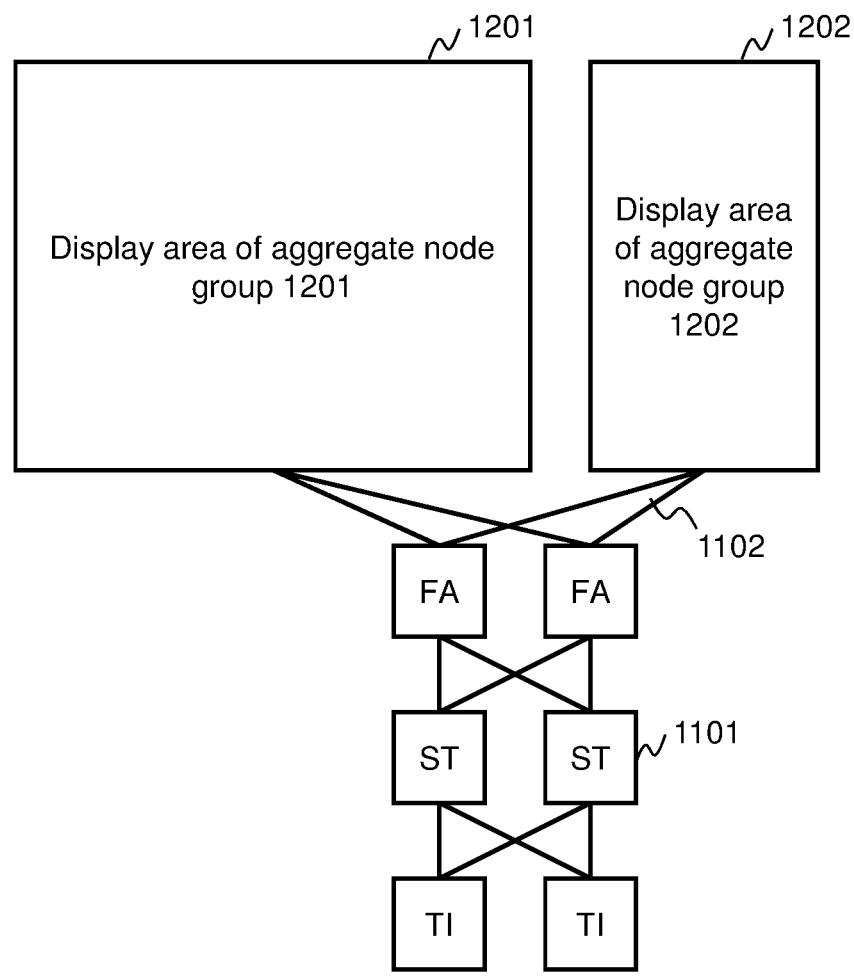
FIG. 13 is a diagram for illustrating an arrangement of pieces of display information of node groups and other nodes according to one embodiment.
Figure 14:
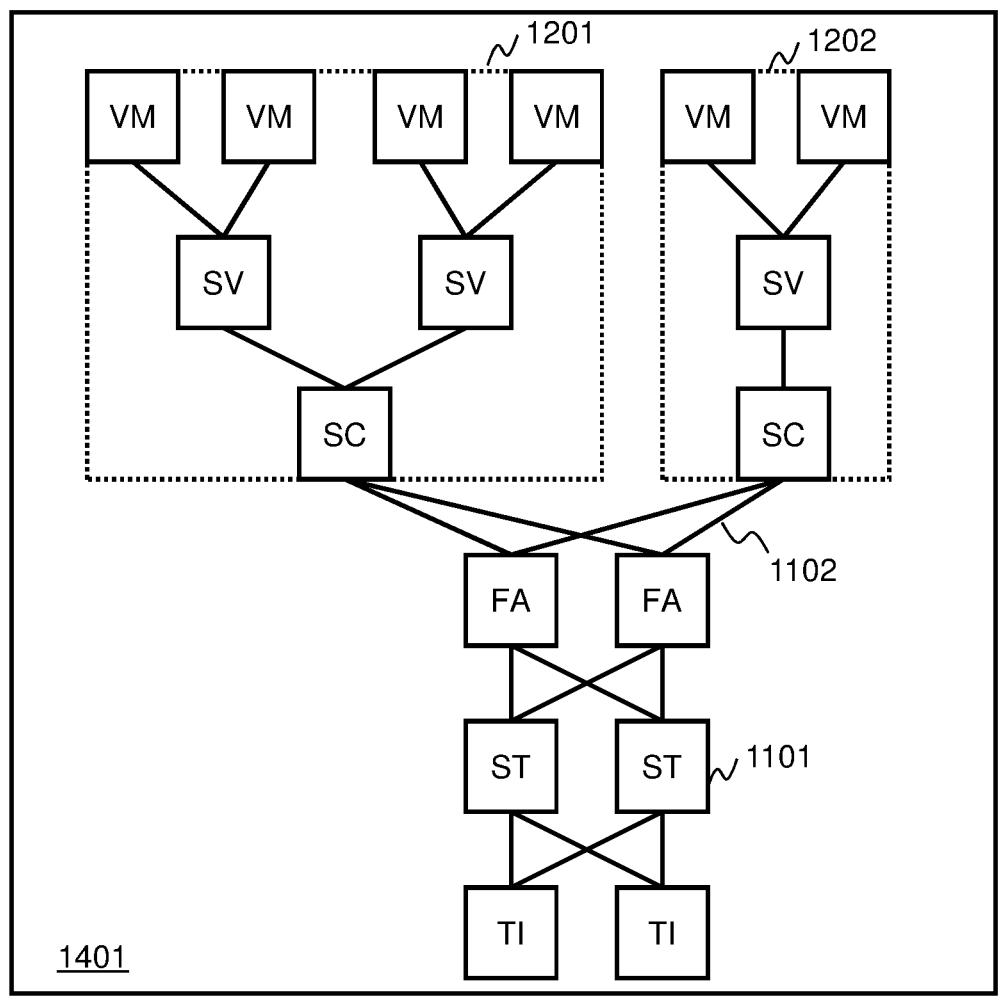
FIG. 14 is a diagram for illustrating an arrangement of pieces of display information of nodes belonging to a node group in a display area of the node group according to one embodiment.

FIG. 10 is a diagram for illustrating nodes and node groups of an IT system according to one embodiment. FIG. 11 is a diagram for illustrating an arrangement of pieces of display information of nodes in a node group according to the embodiment. FIG. 12 is a diagram for illustrating node groups and other nodes according to one embodiment. FIG. 13 is a diagram for illustrating an arrangement of display areas of node groups and pieces of display information of other nodes according to one embodiment. FIG. 14 is a diagram for illustrating an arrangement of pieces of display information of nodes belonging to a node group in a display area of the node group according to one embodiment.

An IT system to be a target described below is configured as shown in FIG. 10. In FIG. 10, each node is indicated by display information (a node icon) 1101 representing the node and, with respect to coupled (related) nodes, corresponding node icons 1101 are connected by a link 1102. In FIG. 10, among the node icons 1101, SV denotes a server, SC denotes a server cluster, FA denotes a fabric, ST denotes a storage, and TI denotes a Tier.

In the IT system shown in FIG. 10, when step 701 is executed, an aggregate node group 1111 and an aggregate node group 1112 are searched.

In addition, when the process of step 702 is performed with respect to the aggregate node group 1111, as shown in FIG. 11, coordinates of node icons 1101 of nodes belonging to the aggregate node group 1111 are calculated so that the respective node icons 1101 are positioned in accordance with tiers of the nodes in the IT system 1, the respective node icons 1101 do not overlap with each other, and intersections of links are minimized, and a range that encompasses the respective node icons 1101 is determined as a display area 1201 of the node icons of the nodes of the aggregate node group 1111. In the present embodiment, the display area 1201 has a rectangular shape having a maximum width (a width in a lateral (an X axis) direction) including the respective node icons 1101 and a maximum height (a width in a vertical (a Y axis) direction) including the respective node icons 1101. It should be noted that, in step 702, a similar process is also performed with respect to the aggregate node group 1112, coordinates where each node icon 1101 is to be arranged is calculated, and a display area 1202 (refer to FIG. 12) is determined.

In step 704, with the display area 1201 of the aggregate node group 1111, the display area 1202 of the aggregate node group 1112, and the node icons 1101 of other nodes that do not belong to the aggregate node groups shown in FIG. 12 as targets, a process of calculating their respective arrangement positions is performed so that the display areas and the node icons do not overlap with each other. In the example shown in FIG. 12, in step 704, arrangement positions are calculated with the display area 1201, the display area 1202, and six node icons 1101 as targets. Therefore, for example, compared to a calculation process of arrangement positions with all of the node icons 1101 shown in FIG. 10 or, in other words, 18 node icons 1101 as targets, a processing load can be significantly reduced.

Once the process of step 704 ends, for example, as shown in FIG. 13, arrangements of the display area 1201 of the aggregate node group 1111, the display area 1202 of the aggregate node group 1112, and the node icons 1101 of other nodes that do not belong to the aggregate node groups are determined. According to the process of step 704, the display area 1201 of the aggregate node group 1111, the display area 1202 of the aggregate node group 1112, and the node icons 1101 are arranged so as not to overlap with each other and, at the same time, the display area 1201, the display area 1202, and the node icons 1101 are arranged in accordance with tiers of corresponding components so as to be aligned in, for example, an upward/downward direction.

In step 705, a process is performed to expand (arrange) each node at the coordinates of each node of the aggregate node groups calculated in step 702 in the display area 1201 of the aggregate node group 1111 and the display area 1202 of the aggregate node group 1112 in the arrangement shown in FIG. 13. By performing the process of step 705, an IT system configuration screen 1401 such as that shown in FIG. 14 is generated. Alternatively, when a node icon 1101 on the IT system configuration screen 1401 is depressed, detailed information of the node corresponding to the depressed node icon 1101 may be displayed.

Next, a computer system according to a modification will be described.

The computer system according to the modification differs from the computer system according to the embodiment described above in the process performed by the component group searching unit 621. Specifically, while the component group searching unit 621 searches for a single server cluster, a server that belongs to the server cluster, and a VM that runs on the server as an aggregate node group that is aggregable in the embodiment described above, in the modification, the component group searching unit 621 searches for an aggregate node group that is aggregable on the basis of coupling relations of components (nodes) of the IT system 1.

Figure 15:
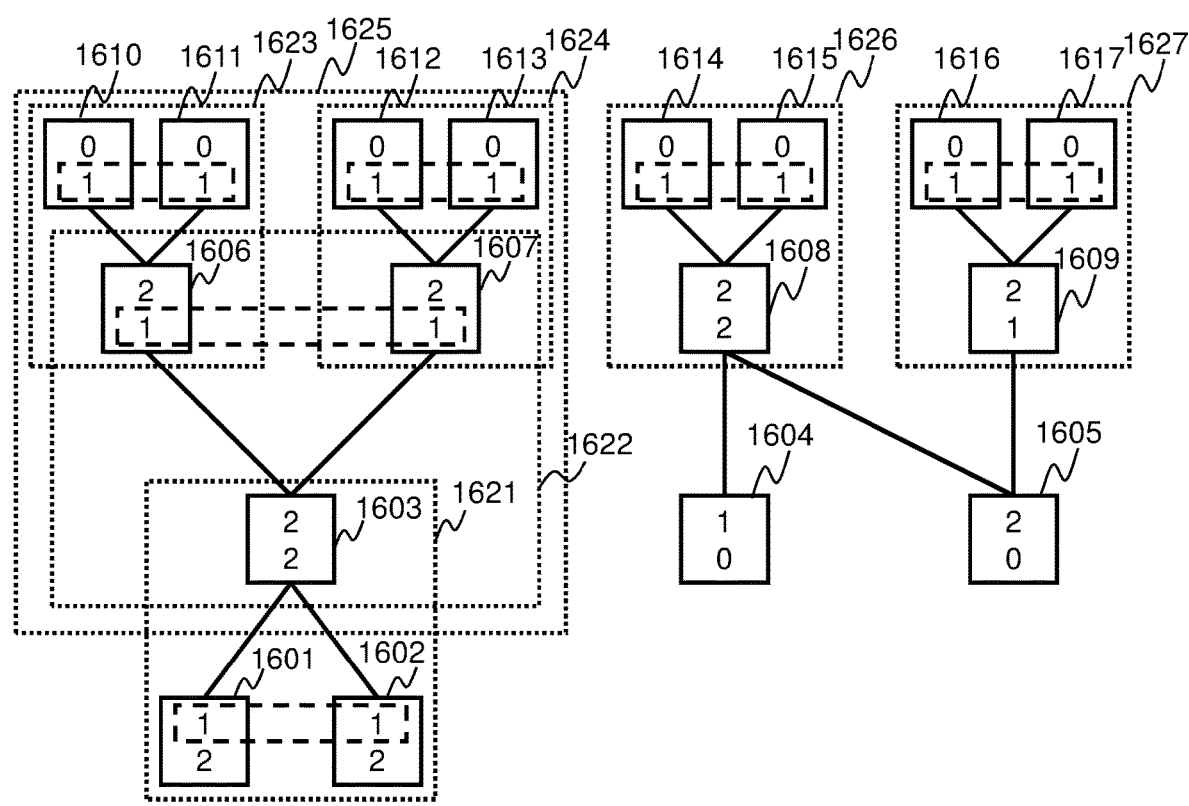
FIG. 15 is a diagram for illustrating a process of searching for an aggregate node group that is aggregable according to a modification.

FIG. 15 is a diagram for illustrating a process of searching for an aggregate node group that is aggregable according to a modification.

With respect to each of nodes 1601 to 1617 to be display targets of an IT system, the component group searching unit 621 calculates the number of coupled (related) nodes in an immediately higher tier (the number of higher couplings) and the number of coupled (related) nodes in an immediately lower tier (the number of lower couplings). The number of coupled nodes can be calculated by referring to the node information 500 and the link information 510.

Next, when all of the nodes in the immediately higher tier which are coupled to a certain node are in a relation (a first relation) of being coupled only to the certain node or, in other words, when all of the coupled nodes in the immediately higher tier have a relation of which the number of lower couplings is 1, the component group searching unit 621 can determine that the certain node and all of the coupled nodes in the immediately higher tier are an aggregate node group. For example, since the node 1606 and the nodes 1610 and 1611 coupled to the node 1606 from a higher order thereof have the first relation, the nodes 1606, 1610, and 1611 can be organized as an aggregate node group 1623. In a similar manner, an aggregate node group 1622, an aggregate node group 1624, an aggregate node group 1626, and an aggregate node group 1627 are present in FIG. 15.

In addition, when all of the nodes in the immediately lower tier which are coupled to a certain node are in a relation (a second relation) of being coupled only to the certain node or, in other words, when all of the coupled nodes in the immediately lower tier have a relation of which the number of higher couplings is 1, the component group searching unit 621 can determine that the certain node and all of the coupled nodes in the immediately lower tier are a single aggregate node group. For example, since the node 1603 and the nodes 1601 and 1602 coupled to the node 1603 from a lower order thereof have the second relation described above, the nodes 1603, 1601, and 1602 can be organized as an aggregate node group 1621.

In addition, the component group searching unit 621 may determine aggregate node groups with a single common node among a plurality of aggregate node groups as a single aggregate node group. For example, since the aggregate node group 1622 and the aggregate node group 1623 share the node 1606, the aggregate node groups may be considered a single aggregate node group, since the aggregate node group 1622 and the aggregate node group 1624 share the node 1607, the aggregate node groups may be considered a single aggregate node group, and the aggregate node groups 1622, 1623, and 1624 may be organized into an aggregate node group 1625.

The component group searching unit 621 may search for all aggregate node groups among nodes to be display targets of the IT system in step 701 and consider the searched aggregate node groups to be targets of subsequent processes or search for any part of the aggregate node groups in step 701 and consider the searched aggregate node groups to be targets of subsequent processes. Which aggregate node group is to be considered a processing target may be selected according to a criterion configured in advance or an instruction issued by a user may be accepted.

In addition, aggregate node groups to be processing targets may include a certain aggregate node group (a small aggregate node group: corresponds to a small component group) and an aggregate node group (a large aggregate node group) which includes the certain aggregate node group. In this case, for example, in the process of calculating coordinates of display information in a node group in a large aggregate node group in step 702, a process similar to step 704 or, in other words, a process of calculating arrangement positions may be performed so that a display area of the small aggregate node group and pieces of display information of other nodes do not overlap with each other. Accordingly, a processing load when calculating coordinates of pieces of display information of nodes in the large aggregate node group can be suitably reduced.

As described above, in the computer system according to the modification, an aggregate node group can be suitably searched from a configuration of an IT system.

It is to be understood that the present invention is not limited to the embodiment described above and that various modifications can be made in the invention without departing from the spirit and scope thereof.

For example, while an example in which all components of an IT system are considered display targets has been shown in the embodiment described above, the present invention is not limited thereto and a part of the components of the IT system may be considered display targets.

In addition, while display information of components and the like are arranged on a virtual screen and subsequently displayed on a display screen from the virtual screen in the embodiment described above, the present invention is not limited thereto and display information of components and the like may be directly arranged and displayed on the display screen.

Furthermore, while an example of applying a graph drawing algorithm using a dynamic model has been shown as a process of determining a display area of an aggregate node group and arrangement positions of pieces of display information of nodes in step 702 or 704 in the embodiment described above, the present invention is not limited thereto and the arrangement positions may be determined on the basis of other algorithms (for example, the Sugiyama framework).

In addition, while a configuration display process is executed at the Web client 4 in the embodiment described above, alternatively, at least a part of the configuration display process may be executed by the configuration display system 3.

Furthermore, while pieces of display information of nodes in an aggregate node group are arranged in step 702, a size of a display area of the aggregate node group is determined on the basis of the arrangement, and the process of step 704 is executed using the determined size of the display area in the embodiment described above, the present invention is not limited thereto and, for example, the process of step 704 may be executed by setting the size of the display area of the aggregate node group to a size configured in advance and arrangement coordinates of the pieces of display information of the nodes in the aggregate node group may be calculated with respect to the display area of the aggregate node group determined by the process of step 704. In this case, when the pieces of display information of the nodes cannot be suitably displayed in the display area of the aggregate node group in an initial size of the pieces of display information, the size of the pieces of display information of the nodes may be adjusted.

In addition, a part of or all of the processes performed by the CPU in the embodiment described above may be performed by a hardware circuit. Furthermore, the programs in the embodiment described above may be installed from a program source. The program source may be a program distribution server or a storage medium (for example, a portable storage medium).

What is claimed is:

1. A configuration display apparatus that displays a plurality of components to be a display target and relations of the components in an IT system, the configuration display apparatus comprising:
    a component group searching unit configured to search for a component group including a plurality of components that are aggregable as a same group among the plurality of components to be display target;
    a display information arranging unit configured to arrange a display area for display information with respect to the searched component group and pieces of display information with respect to components that do not belong to the component group on a prescribed screen such that the display area and the pieces of display information of the components that do not belong to the component group do not overlap with each other;
    an in-group arranging unit configured to arrange pieces of display information with respect to the plurality of components included in the component group so as not to overlap with each other in the display area for display information with respect to the component group; and
    a display control unit configured to cause a display screen on the basis of a screen on which pieces of display information with respect to the plurality of components to be a display target are arranged to be displayed.

2. The configuration display apparatus according to claim 1, wherein
    the in-group arranging unit is configured to determine an area large enough to encompass pieces of display information with respect to a plurality of components included in the component group in a case where the pieces of display information are arranged so as not to overlap with each other as a display area for displaying the display information with respect to the component group, and the display information arranging unit is configured to arrange the display area on the screen such that the display area does not overlap with pieces of display information with respect to components that do not belong to the component group.

3. The configuration display apparatus according to claim 2, wherein a size of the display information with respect to the component on the screen is a common size.

4. The configuration display apparatus according to claim 1, wherein the component group includes a server cluster and a server and a virtual computer which belong to the server cluster.

5. The configuration display apparatus according to claim 1, wherein the component group includes a certain component of a predetermined tier and one or more components which are coupled to the certain component on a higher tier than the predetermined tier or a lower tier than the predetermined tier and which are not coupled to other components of a same type as the certain component.

6. The configuration display apparatus according to claim 1, wherein the component group includes a large component group that includes at least one small component group, the at least one small component group being a component group capable of aggregating a part of components among the components belonging to the component group, and the in-group arranging unit is configured to arrange, in a display area for the display information with respect to the large component group, a display area of display information with respect to the at least one small component group and pieces of display information with respect to components that do not belong to the at least one small component group so as not to overlap with each other.

7. The configuration display apparatus according to claim 1, wherein the pieces of display information of the plurality of components are coupled on the basis of a coupling relation among a plurality of components, and the display information arranging unit is configured to determine positions of display information of the component group and pieces of display information of the components according to a prescribed dynamic model.

8. The configuration display apparatus according to claim 7, wherein the display information arranging unit is configured to adjust positions of display information of the component group and pieces of display information of the components in accordance with a tier of the components in the IT system.

9. A configuration display method by a configuration display apparatus that displays a plurality of components to be a display target and relations of the components in an IT system, the configuration display method comprising the steps of:

searching for a component group including a plurality of components that are aggregable as a same group among the plurality of components to be a display target;

arranging a display area for display information with respect to the searched component group and pieces of display information with respect to components that do not belong to the component group on a prescribed screen such that the display area and the pieces of display information of the components that do not belong to the component group do not overlap with each other;

arranging pieces of display information with respect to the plurality of components included in the component group so as not to overlap with each other in the display area for display information with respect to the component group; and causing a display screen based on a screen on which pieces of display information with respect to the plurality of components to be a display target are arranged to be displayed.

10. The configuration display method according to claim 9, wherein the step of arranging pieces of display information with respect to the plurality of components in the component group includes determining an area large enough to encompass pieces of display information with respect to a plurality of components included in the component group in a case where the pieces of display information are arranged so as not to overlap with each other as a display area for displaying the display information with respect to the component group, and the step of arranging the display area for display information includes arranging the display area on the screen such that the display area does not overlap with pieces of display information with respect to components that do not belong to the component group.

11. A non-transitory computer readable recording medium storing a configuration display program that causes a computer to execute a process of displaying a plurality of components to be a display target and relations of the components in an IT system, the configuration display program causing the computer to:

search for a component group including a plurality of components that are aggregable as a same group among the plurality of components to be a display target;

arrange a display area for display information with respect to the searched component group and pieces of display information with respect to components that do not belong to the component group on a prescribed screen such that the display area and the pieces of display information of the components that do not belong to the component group do not overlap with each other;

arrange pieces of display information with respect to the plurality of components included in the component group so as not to overlap with each other in the display area for display information with respect to the component group; and cause a display screen on the basis of a screen on which pieces of display information with respect to the plurality of components to be a display target are arranged to be displayed.

* * * * *